(12) United States Patent
Cedergren

(10) Patent No.: US 9,802,453 B1
(45) Date of Patent: Oct. 31, 2017

(54) SLIDING DEVICE

(71) Applicant: Cedergrens Mek. Verkstad Aktiebolag, Klintehamn (SE)

(72) Inventor: Curt Cedergren, Klintehamn (SE)

(73) Assignee: CEDERGRENS MEK. VERKSTAD AKTIEBOLAG, Klintehamn (SE)

( * ) Notice: Subject to any disclaimer, the term of this patent is extended or adjusted under 35 U.S.C. 154(b) by 0 days.

(21) Appl. No.: 15/464,365

(22) Filed: Mar. 21, 2017

(30) Foreign Application Priority Data

Apr. 8, 2016 (SE) ...................................... 1650480

(51) Int. Cl.
*B60G 3/01* (2006.01)
*B60P 3/06* (2006.01)

(52) U.S. Cl.
CPC . *B60G 3/01* (2013.01); *B60P 3/06* (2013.01)

(58) Field of Classification Search
CPC ... B60G 3/01; B60G 3/02; B60G 3/04; B60G 3/12; B60P 3/06; B60P 3/062; B60P 3/064; B60P 3/066; B60P 3/068; B60P 3/07
USPC .............. 280/43, 43.11, 43.12, 43.16, 79.11; 414/227, 253, 258
See application file for complete search history.

(56) References Cited

U.S. PATENT DOCUMENTS

| 4,700,798 A | * | 10/1987 | Johansson | B62D 61/12 180/198 |
| 4,733,885 A | | 3/1988 | Charles et al. | |
| 4,846,484 A | * | 7/1989 | Nekola | B66F 5/02 280/43 |
| 4,998,594 A | * | 3/1991 | Orloski | B60P 3/06 180/198 |
| 6,024,381 A | | 2/2000 | Mottola et al. | |
| 2011/0170992 A1 | * | 7/2011 | Rosenthal | B60S 13/00 414/258 |
| 2014/0265283 A1 | | 9/2014 | Clifton et al. | |

FOREIGN PATENT DOCUMENTS

WO 8402689 7/1984

* cited by examiner

*Primary Examiner* — John D Walters
(74) *Attorney, Agent, or Firm* — BelayIP Oy

(57) ABSTRACT

Described herein is a sliding device (1) designed to receive a vehicle (7). The sliding device includes a frame (5) on which the vehicle is intended to be received, at least three sliding wheels (3*a-d*) vertically adjustable relative to the frame and each wheel operatively connected to the frame via at least one vertically disposed rotatable shaft (9*a-d*), a plurality of vertical folding shafts (19*a-d*) connected to the frame, a plurality of cross bars (14*a-b*, 15*a-b*) elevated relative to the frame, the cross bars are operatively connected to the wheels via the rotatable shafts (9*a-d*), and pivotally connected to the frame via the vertical folding shafts (19*a-d*) so that each of the cross bars is movable between a folded and an unfolded position (3), and a folding lock (21) adapted to lock the vertical folding shaft (19*a-d*) relative the frame in the unfolded position to prevent it from being turned.

11 Claims, 5 Drawing Sheets

SLIDING DEVICE

FIELD OF THE INVENTION

The present invention relates to a sliding device for reducing the adhesion of a vehicle. In particularly, the invention relates to a sliding device intended for skidpan practice.

BACKGROUND OF THE INVENTION

Sliding devices that can deliberately reduce the adhesion of a vehicle for exercises regarding skidpan practice are known from e.g. WO8402689. WO8402689 describes a device with a set of wheels mounted on a frame. The frame is designed so that it can support a vehicle and the wheels are vertically adjustable in order to control the force in which the wheels bear on the ground. The wheels of the sliding device are rotatable about a vertical shaft, so they provide no steering of the vehicle. By lowering the wheels of the sliding device and thereby raising the vehicle and the wheels of the vehicle, the adhesion of the vehicle can be controlled so that the behavior of the vehicle corresponds to that of a slippery surface.

The wheels of the sliding device protrude from the sides of the vehicle in order to achieve enough space for the wheels to rotate freely without hitting the side of the vehicle. This makes the sliding device wide and it can, for example, be difficult to fit a vehicle mounted on the sliding device in a carriage for transport.

These and other objects are achieved by a sliding device with reducible width according to the characterized parts of the independent claim.

OBJECT AND SUMMARY OF THE INVENTION

It is an object of the present invention to at least partly overcome the above problems.

The sliding device is designed to receive a vehicle, and the sliding device comprises a frame on which the vehicle is intended to be received, at least three sliding wheels vertically adjustable relative to the frame and each wheel operatively connected to the frame via at least one vertically disposed rotatable shaft, a plurality of vertical folding shafts connected to the frame, a plurality of cross bars elevated relative to the frame, the cross bars are operatively connected to the wheels via the rotatable shafts, and pivotally connected to the frame via the vertical folding shafts so that each of the cross bars is movable between a folded and an unfolded position, and a folding lock adapted to lock the vertical folding shaft relative to the frame in the unfolded position to prevent it from being turned.

The present invention provides a sliding device with reducible width. The cross bars and the wheels can be moved between an unfolded and a folded position in order to adjust the width of the sliding device.

When the sliding device is in use, the cross-bars are in the unfolded position and protrudes from the sides of the vehicle. According to the invention, the cross bars are pivotally connected to the frame via vertical shafts. The cross bars are then allowed to be rotated to a folded position towards the sides of the vehicle so that the width of the sliding device carrying the vehicle is less than in the unfolded position.

The wheels are rotatably connected to the cross bars via the rotatable shafts. Due to the rotatable shafts, the width of the device can be decreased further since the wheels are allowed to be rotated so they faces a direction parallel to a longitudinal axis of the vehicle when the cross bars are in the folded position. The folding shaft and the rotatable shaft on each wheel therefor cooperate in an advantageous manner in order to reduce the width of the vehicle. The folding lock makes it possible to lock the cross bar relative the frame in the unfolded position thereby eliminates the risk that the cross bars and accordingly the wheels are moved to folded position when the device is in use.

If a vehicle is mounted on the sliding device and needs to be transported in an enclosed carriage with side walls, the cross bars are moved to the folded positon and thereby the width of the sliding device is reduced.

According to an embodiment of the invention, the vertical folding shaft is a bolt rotatably connected to the frame. This is an advantages considering that the cross bar can easily be prevented from rotating from the folded or the unfolded position by just tightening the bolt. However, only tightening the bolt is not safe enough to be used for locking the cross bar in the unfolded position during use of the device. In the unfolded position, the folding lock should be used to prevent the cross bar from rotating from the unfolded or the folded position.

According to an embodiment of the invention, the folding lock comprises a protruding portion and a receiving portion adapted to cooperate with the protruding portion to lock the vertical folding shaft. For example, the protruding portion is attached to the frame and the receiving portion is attached to one of the cross-bars, or vice versa. The protruding portion and the receiving portion are parts of the folding lock.

According to an embodiment of the invention, the protruding portion and the receiving portion are arranged so that the protruding portion faces the receiving portion when the cross-bar is in the unfolded position, and the folding lock further comprises at least one securing member adapted to attach the protruding portion to the receiving portion when the cross-bar is in the unfolded position and thus locking the cross bar to the frame.

According to an embodiment of the invention, each of the protruding and the receiving portions comprises at least one through hole, that faces each other when the cross bar is in the unfolded position and the through holes are adapted to receive the securing member, thus locking the cross bar to the frame. This provides for an easy and efficient way for locking the vertical folding shaft relative the frame.

According to an embodiment of the invention, the securing member comprises two bolts. Using two bolts as securing members is an easy comprehensible method for locking the protruding and receiving portions to each other.

To further increase the safety and to ensure that the cross bars and accordingly the wheels do not rotate to the folded position when the device is in use, each of the protruding and the receiving portions may comprise two through holes, and the securing member may comprise two bolts to be entered though the holes in order to lock the protruding receiving portions to each other.

According to an embodiment of the invention the sliding device comprises hydraulic cylinders adapted to lower and raising the sliding device by decreasing and increasing the vertical distance between the cross bar and the wheel.

DETAILED DESCRIPTION OF PREFERRED EMBODIMENTS OF THE INVENTION

Figure 1:
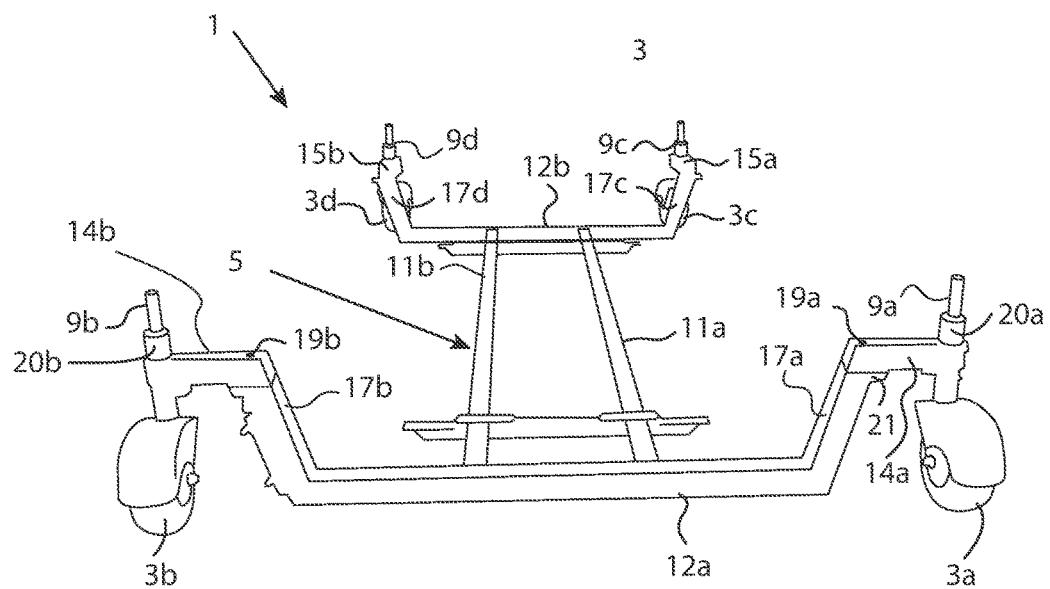
FIG. 1 shows a sliding device according to an embodiment of the invention.

FIG. 1 shows a sliding device 1 according to an embodiment of the invention. The invention refers to a construction detail in a device referred to herein as a sliding device 1, and this referrers to a device with a set of sliding wheels 3a-d mounted on a frame 5. In a preferred embodiment, the sliding wheels are pivot wheels. The frame 5 is designed so that it can carry a vehicle 7, and the wheels are vertically adjustable in order to control the force in which the wheels 3a-d bear on the ground. The sliding wheels are rotatable about substantially vertical rotatable shafts 9a-d, so they provide no steering of the vehicle 7. By lowering the sliding wheels 3a-d of the sliding device 1, and thereby raising the vehicle 7 and the wheels of the vehicle, the adhesion of the vehicle can deliberately be reduced, and this can be used for exercises regarding skidpan practice. The result is that the adhesion of the vehicle 7 can be controlled so that the behavior of the vehicle corresponds to that of a slippery surface. The term sliding device does not refer to any limitation in the design of the device, and should only be interpreted as a general reference.

The sliding device 1 comprises four wheels 3a-d, each mounted on a rotatable shaft 9a-d. The rotatable shafts allow each wheel to spontaneously be directed in any direction, so that a vehicle mounted on the sliding device can move in any direction and even rotate around the rotatable shaft 9a-d, as the vehicle would be able to do if the vehicle slid on a slippery surface.

The frame 5 comprises two longitudinal struts 11a-b that extends parallel to each other. The longitudinal struts are connected to a rear transverse strut 12a and a front transverse strut 12b. The front transverse strut 12b extends in a direction parallel to the rear transverse strut 12a. At least a part of the transverse struts 12a-b also extends in a direction perpendicular to the longitudinal struts 11a-b. With the vehicle 7 arranged on the sliding device 1, the longitudinal struts 11a-b extends in the longitudinal direction of the vehicle and the transverse struts 12a-b extends in the vehicle's lateral direction and the transverse struts is connected to each end of the longitudinal struts 11a-b. Two rear cross-bars 14a-b are connected to each end of the rear transverse strut 12a and two front cross-bars 15a-b are connected to each end of the front transverse strut 12b. The cross-bars 14a-b, 15a-b extends in a direction perpendicular to the longitudinal struts 11a-b and parallel to the transverse struts 12a-b. The transverse struts extend horizontally in its center, which when in use are disposed underneath the vehicle.

The transverse struts has outer portions 17a-d that are titled upwards. The front and rear cross-bars 14a-b, 15a-b are rotatably connected to these outer portions 17a-d by means of vertical folding shafts 19a-d. The folding shafts 19a-d are arranged at a distance from and parallel to the rotatable shafts 9a-d. The cross-bars 14a-b, 15a-b are rotatable between a folded and an unfolded position. The sliding device 1 further comprises a folding lock 21 adapted to lock the cross-bars 14a-b, 15a-b in the unfolded position, for preventing the cross-bars from moving to the folded position when the sliding device 1 is in use. The sliding wheels 3a-d is disposed under the cross-bars 14a-b, 15a-b. Each wheel is rotatably connected to the cross-bars by means of the rotatable shaft 9a-d. The rotatable shaft 9a-d extends vertically in a direction perpendicular to the longitudinal struts 11a-b and the transverse struts 12a-b. In this embodiment the folding shafts 19a-d are bolts, which when loosened allow the cross-bars 14a-b, 15a-b to be rotated around the bolts. The sliding device 1 has four sliding wheels 3a-d. The sliding wheels can be raised and lowered by means of hydraulic cylinders 20a-b at the rotatable shafts 9a-d.

Figure 2:
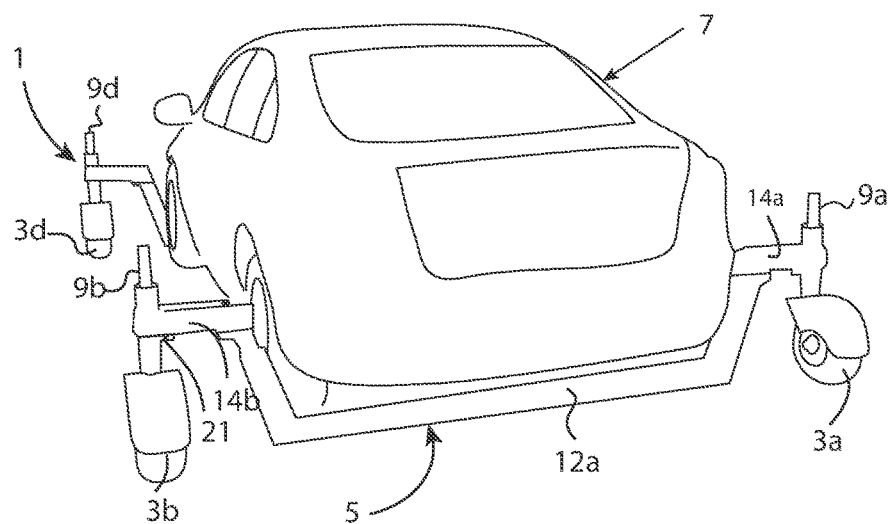
FIG. 2 shows a vehicle disposed on the sliding device shown in FIG. 1.

FIG. 2 shows a vehicle 7 arranged on the sliding device 1 and as shown, the wheels of the vehicle 7 touches the ground, while a part of the weight of the vehicle 7 rests on the frame 5 of the sliding device 1. By lowering the sliding wheels 3a-d and thus raising the vehicle 7, a greater part of the weight of the vehicle is transferred to the sliding device so that the friction between the wheels of the vehicle 7 and the ground is reduced.

In order for the sliding wheels 3a-d of the sliding device 1 to rotate freely around the rotatable shafts 9a-d, the rotatable shafts are arranged at a distance outwards from the sides of the vehicle 7, so that regardless of the angular position of the wheels, the wheels 3a-d can't hit the side of the vehicle. This makes the total width of the sliding device 1 considerably larger than the width of the vehicle 7, which is undesirable if the sliding device should pass a narrow space, e.g. if it is to be transported in an enclosed carriage with side walls. By rotating the cross-bars 14a-b, 15a-b by means of the folding shafts 19a-d to the folded positions, the total width of the sliding device 1 is reduced and makes it possible for the sliding device 1 and the vehicle 7 to be transported on the carriage. This will be described in more details with reference to FIG. 5.

Figure 3:
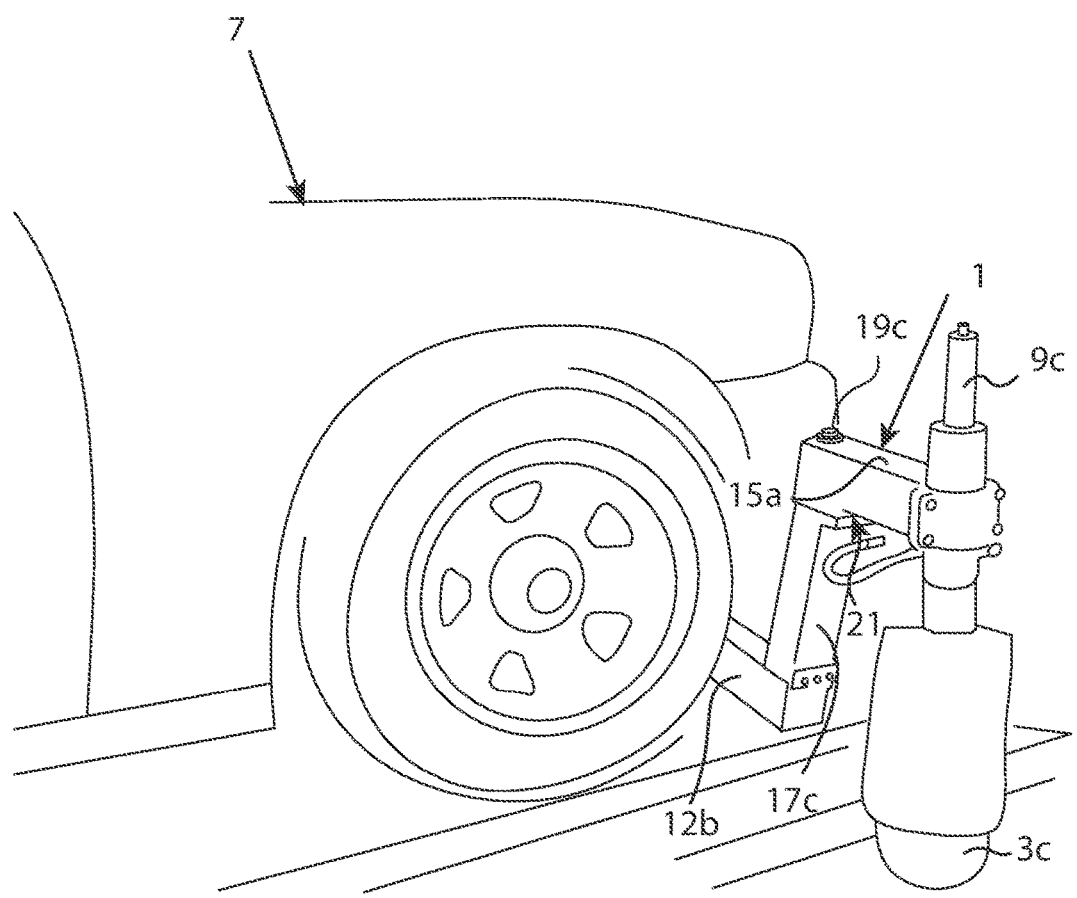
FIG. 3 shows one of the wheels of the sliding device in an unfolded position.

FIG. 3 shows a front potion of a vehicle 7 arranged on the sliding device 1, and the cross-bar 15a is illustrated in the unfolded position that constitutes its position in use, and accordingly its position when the vehicle is used for skidpan practice. Thus, in this position the cross-bar 15a extends in the vehicle's lateral direction so that the sliding wheels 3c of the sliding device, which is operatively connected to the cross-bars 15a, is positioned at a distance from the side of the vehicle 7. The wheel 3c of the sliding device as illustrated in the figure is mounted on the rotatable shaft 9c, and the other sliding wheels are arranged in a corresponding manner. The sliding device 1 comprises a folding lock 21 adapted to lock the vertical folding shaft 19a-d relative the frame in the unfolded position to prevent it from being turned. Each of the cross bars is provided with a folding lock 21.

Figure 4A:
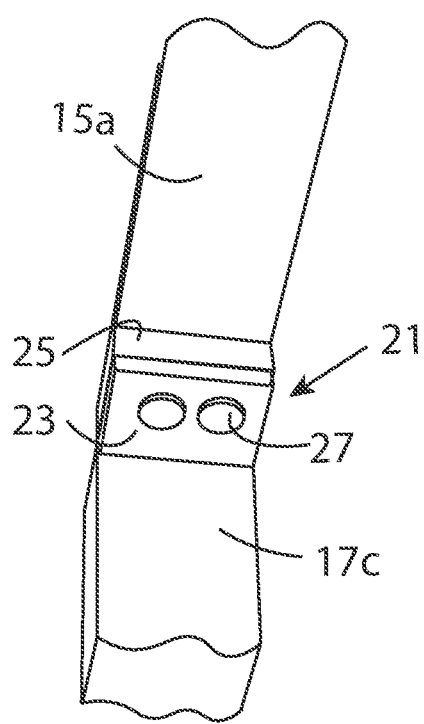
FIGS. 4a-b show an example of a folding lock in the folded and unfolded position.
Figure 4B:
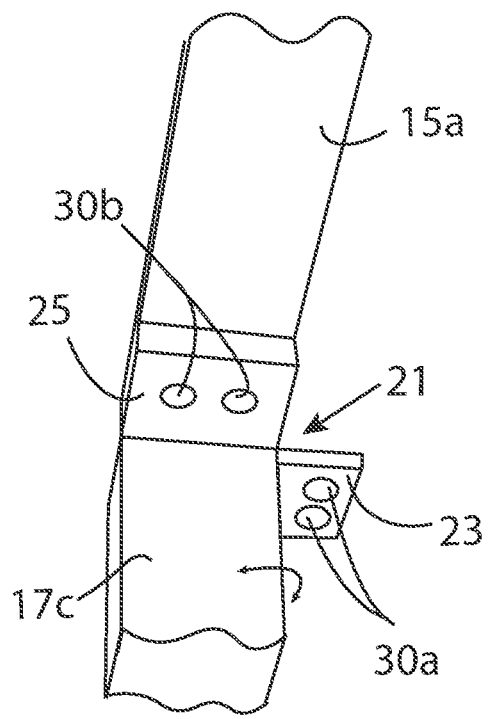

FIGS. 4a-b show an example of a folding lock 21 in the folded and unfolded position. FIGS. 4a-b show the folding lock in a view seen from below. In this embodiment, the folding lock 21 comprises a protruding portion 23, a receiving portion 25, and securing members 27. In this example, the outer portion 17c of the frame comprises a protruding portion 23, and the cross-bar 15a comprises a receiving portion 25 adapted to cooperate with the protruding portions 23 to lock the vertical folding shafts 19c and prevent it from rotating. In a preferred embodiment, each of the outer portions 17a-d of the frame comprises a protruding portion 23, and each of the cross-bars 14a-b, 15a-b comprises a receiving portion 25 adapted to cooperate with the protruding portion to lock the vertical folding shafts 19a-d and prevent them from rotating. However, it is also possible to only provide some, for example two, of the folding shafts 19*a-d* with folding locks. Alternatively, the outer portion 17*c* of the frame may comprises the receiving portion 25 and the cross-bar 15*a* may comprises the protruding portion 23. In this embodiment, the protruding portion 23 comprises at least one through hole 30*a*, and suitably two through hole 30*a*, and the receiving portion 25 comprises at least one through hole 30*b*, and suitably two through holes 30*b*. The protruding portion 23 and the receiving portion 25 are arranged so that they are space apart when the cross-bar is in the folded position, as shown in FIG. 4*b*, and so that the protruding portion 23 faces the receiving portion 25 when the cross-bar is in the unfolded position, as shown in FIG. 4*a*. Thus, the through hole 30*a* and 30*b* are aligned when the cross-bar is in the unfolded position, and thereby allowing the securing members 27 to enter the through holes and to removably attach the protruding portion 23 to the receiving portion 25, thus locking the cross bar to the frame. In one embodiment, the securing members 27 are two mounting bolts.

The receiving portion is fixedly connected to the outer portions and faces the protruding portion in the unfolded position. The protruding portion is connected to the cross-bar and extends outwards from the cross-bar. The protruding and receiving portion are locked together by means of the securing member. In this embodiment the protruding and the receiving portion comprises through holes and the securing member is two mounting bolts adapted to penetrate the through holes 30*a-b*, thus locking the protruding and the receiving portions together and preventing that the cross-bar turns around the folding shaft 19*c*. By removing the two mounting bolts, the locking of the cross-bars ceases and the cross-bar is allowed to be rotated towards the folded position.

FIG. 3 also shows a tip of the vertical folding shaft 19*c*, which allows the cross-bar 15*a* with associated wheel 3*c* to be folded inwards towards the side of the vehicle 7. However, in this position the function of the folding shaft 19*c* has been eliminated by means of the folding lock 21.

Figure 5:
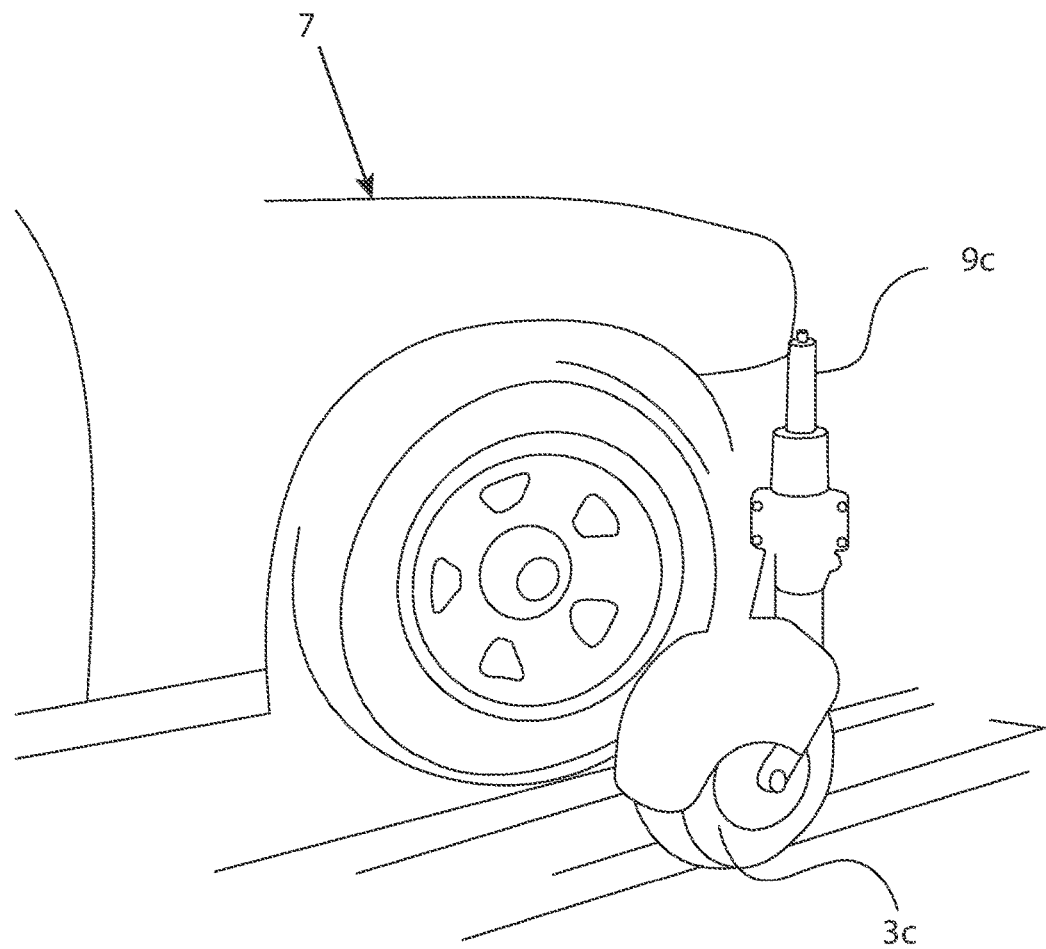
FIG. 5 shows one of the wheels of the sliding device in an intermediate position.

FIG. 5 shows one of the wheels of the sliding device 1 in an intermediate position between the unfolded and folded positions. The securing members/mounting bolts 27 have now been removed and the bolt, constituting the vertical folding shaft 19*c*, has been loosened so that the cross-bar 15*a* is allowed to be turned around the vertical folding shaft 19*c*. The front cross-bars 15*a-b* has now been turned a distance towards the side of the vehicle 1. The cross-bar and the entire vertical folding shaft 19*c* is not shown in the figure. In this embodiment, the mounting bolts 27 have been loosened and removed so that the cross-bar 15*a* is allowed to be turned around the vertical folding shaft 19*c*.

Figure 6:
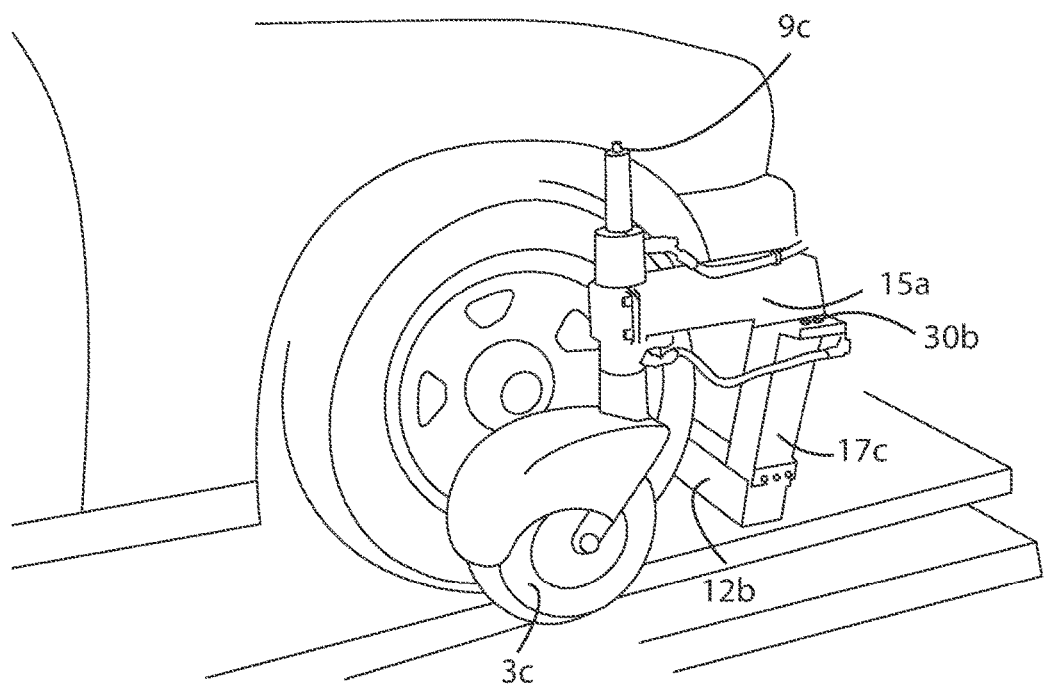
FIG. 6 shows one of the wheels of the sliding device in a folded position.

FIG. 6 shows the wheel 3*c* of the sliding device 1 in a third position, wherein the cross-bar 15*a* has been turned to a maximum extent towards the side of the vehicle 7. In order to reach this position, the sliding wheels 3*a-d* of the sliding device 1 need to be turned so they are in parallel with the wheels of the vehicle. This can easily be done since the wheels of the sliding device can be turned around the rotatable shafts 9*a-d*. With the crossbars 14*a-b*, 15*a-b* folded inwards in this manner, the wheels of the sliding device take up a minimal width and can easily be rolled onto a small carrier. Naturally, the sliding wheels 3*a-d* of the sliding device 1 are preferably raised to its maximum height so that the wheels of the vehicle 7 have a maximum amount of friction onto the surface so that the vehicle 7 can be steered and slowed down conventionally.

The described embodiment does not mention how the sliding wheels 3*a-d* of the sliding device 1 can be raised and lowered, but this can be achieved in many different ways, e.g. by means of hydraulic cylinders, one on each wheel 3*a-d*, which is controlled so that all the wheels are raised and lowered to the same extent. Alternatively, each wheel can be provided with a screw or some other means that achieves a vertical movement on the wheels.

In the described embodiment, the vertical folding shafts 19*a-d* are locked by means of two bolts, but obviously the locking can be achieved in many different ways, e.g. by electronic or pneumatically controlled elements that engages with or is pulled out of engagement with the cross-bars so that it locks against the center of the cross-bar.

The description of the frame 5 is of course just an example of a cost-efficient way to design such a frame. However, it can of course be designed in many different ways. The frame has under all circumstances a central portion that extends under the vehicle with protruding arms to which the cross-bars are connected by means of vertical folding shafts. The sliding device is described herein with four wheels, but principally it could have only three wheels. One wheel on each side of the vehicle, and a third in front or behind the vehicle. Alternatively, the sliding device could have more than four wheels.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A sliding device designed to receive a vehicle, wherein the sliding device comprises:
   a frame on which the vehicle is intended to be received,
   at least three sliding wheels vertically adjustable relative to the frame and each wheel operatively connected to the frame via at least one vertically disposed rotatable shaft,
   a plurality of vertical folding shafts connected to the frame,
   a plurality of cross bars elevated relative the frame, the cross bars are operatively connected to the wheels via the rotatable shafts, and pivotally connected to the frame via the vertical folding shafts so that each of the cross bars is movable between a folded and an unfolded position, and
   a folding lock adapted to lock the vertical folding shaft relative the frame in the unfolded position to prevent it from being turned.

2. The sliding device according to claim 1, wherein the folding shafts are arranged at a distance from and parallel to the rotatable shafts.

3. The sliding device according to claim 1, wherein the vertical folding shaft is a bolt rotatably connected to the frame.

4. The sliding device according to claim 1, wherein said folding lock further comprises one or more bolts (27).

5. The sliding device according to claim 1, wherein said folding lock further comprises a protruding portion and a receiving portion adapted to cooperate with the protruding portion to lock the vertical folding shaft.

6. The sliding device according to claim 5, wherein said protruding portion is attached to the frame and said receiving portion is attached to one of the cross-bars.

7. The sliding device according to claim 5, wherein the protruding portion and the receiving portion are arranged so that the protruding portion faces the receiving portion when the cross-bar is in the unfolded position, and the folding lock further comprises at least one securing member adapted to attach the protruding portion to the receiving portion when the cross-bar is in the unfolded position and thus locking the cross bar to the frame.

8. The sliding device according to claim 5, wherein each of the protruding and the receiving portions comprises at least one through hole that faces each other when the cross bar is in the unfolded position and the through holes are adapted to receive the securing member, thus locking the cross bar to the frame.

9. The sliding device according to claim 7, wherein the securing member further comprises two bolts.

10. The sliding device according to claim 1, wherein the sliding wheels are rotatably connected to the cross bars via the rotatable shafts.

11. The sliding device according to claim 1, wherein the sliding device comprises hydraulic cylinders adapted to lower and raising the sliding device by decreasing and increasing the vertical distance between the cross bar and the wheel.

* * * * *